United States Patent
Taleyarkhan et al.

(10) Patent No.: US 10,093,824 B2
(45) Date of Patent: Oct. 9, 2018

(54) POLYLACTIC ACID-BASED COATING AND USES THEREFOR

(75) Inventors: Rusi P. Taleyarkhan, Lafayette, IN (US); Nicholas Edward Hume, Lafayette, IN (US); Alexander Charles Bakken, Lafayette, IN (US); Thomas Francis Grimes, Lafayette, IN (US)

(73) Assignee: Sagamore Adams Laboratories LLC, Chicago, IL (US)

( * ) Notice: Subject to any disclaimer, the term of this patent is extended or adjusted under 35 U.S.C. 154(b) by 573 days.

(21) Appl. No.: 14/117,421

(22) PCT Filed: May 11, 2012

(86) PCT No.: PCT/US2012/037502
§ 371 (c)(1),
(2), (4) Date: Feb. 10, 2014

(87) PCT Pub. No.: WO2012/158511
PCT Pub. Date: Nov. 22, 2012

(65) Prior Publication Data
US 2014/0227543 A1 Aug. 14, 2014

Related U.S. Application Data

(60) Provisional application No. 61/485,733, filed on May 13, 2011, provisional application No. 61/595,991, filed on Feb. 7, 2012.

(51) Int. Cl.
| | |
|---|---|
| *C09D 167/04* | (2006.01) |
| *B32B 33/00* | (2006.01) |
| *B05D 3/06* | (2006.01) |
| *B05D 3/12* | (2006.01) |
| *B05D 3/02* | (2006.01) |
| *B32B 7/12* | (2006.01) |
| *B32B 27/36* | (2006.01) |

(52) U.S. Cl.
CPC ......... *C09D 167/04* (2013.01); *B05D 3/0254* (2013.01); *B05D 3/068* (2013.01); *B05D 3/12* (2013.01); *B32B 7/12* (2013.01); *B32B 27/36* (2013.01); *B32B 33/00* (2013.01); *B32B 2419/04* (2013.01); *B32B 2471/00* (2013.01); *B32B 2479/00* (2013.01); *Y10T 428/31786* (2015.04)

(58) Field of Classification Search
CPC ..................................................... C09D 167/04
See application file for complete search history.

(56) References Cited

U.S. PATENT DOCUMENTS

| | | | |
|---|---|---|---|
| 2003/0216496 A1* | 11/2003 | Mohanty | B29C 67/24 524/284 |
| 2005/0242466 A1* | 11/2005 | Kanazawa | C08F 283/02 264/236 |
| 2009/0082137 A1* | 3/2009 | Okabe | A63B 37/0003 473/385 |

* cited by examiner

*Primary Examiner* — Ramsey E Zacharia
(74) *Attorney, Agent, or Firm* — Hahn Loeser & Parks, LLP

(57) ABSTRACT

Protective coatings and methods for forming them are disclosed wherein the coatings have increased abrasion, impact and scratch resistance as compared to known coatings. The coatings are made from environmentally friendly materials such as polylactic acid which can be derived from corn. The materials can be used to provide a protective coating on their substrate materials including especially wood for flooring and furniture. The coatings can have a hardness as measured on the Shore D Scale that can reach at least 75 to about 85 and enhanced resistance to abrasions, impact or scratches and can be used to coat flooring or furniture surfaces. The coatings can contain from about 1 to about 10 mass percent of triallyl isocyanurate with respect to polylactic acid.

6 Claims, 2 Drawing Sheets

POLYLACTIC ACID-BASED COATING AND USES THEREFOR

BACKGROUND

Figure 1:
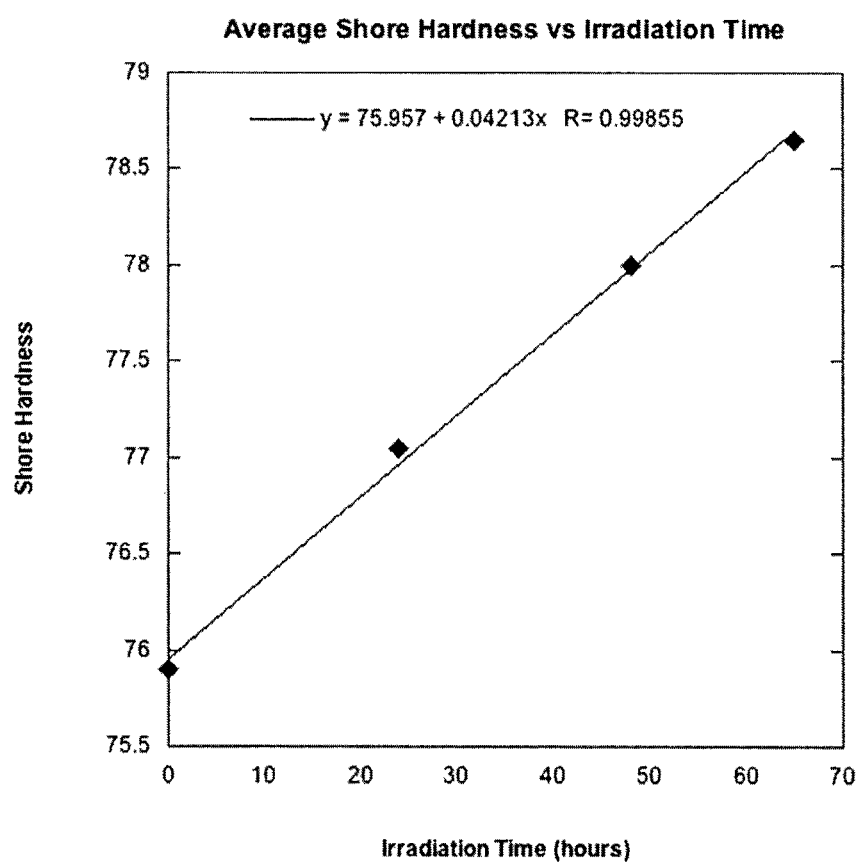

Coatings are often applied to the surfaces of materials as hardeners which can provide a protective barrier. A host of coating products are known, yet each of the most common coatings has disadvantages that limit their usefulness. Coatings like polyurethane are often used in 2-3 millimeter thicknesses in order to chemically isolate the coated materials, such as wood and impart scratch resistance. Unfortunately polyurethane involves the use of carcinogens in its manufacture and workers applying polyurethane industrially must wear full body protection. They were known at one time to suffer health issues from their vocation. Epoxy coatings start at even greater thicknesses, but suffer over time due to light exposure and are not widely used.

There is a need in the art for protective coatings with enhanced abrasion, impact, and scratch resistance. Preferably, the coatings can be made from environmentally friendly materials such as polylactic acid (PLA), a biodegradable thermoplastic material derived directly from corn. The coatings can be used for extending the life of a variety of products including residential and commercial hardwood flooring and furniture.

SUMMARY OF INVENTION

Protective coatings and methods for forming them are disclosed wherein the coatings have increased abrasion, impact and scratch resistance as compared to known coatings. The coatings are made from environmentally friendly materials such as polylactic acid which can be derived from corn. The materials can be used to provide a protective coating on their substrate materials including especially wood for flooring and furniture.

Polylactic acid coatings are disclosed. The coatings can have a hardness as measured on the Shore D Scale of about 75 or more to about 85 and enhanced resistance to abrasions, impact or scratches and can be used to coat flooring or furniture surfaces. The coatings can contain from about 1 to about 10 mass percent of triallyl isocyanurate with respect to polylactic acid.

Processes for forming the coating layers are also disclosed. Generally the process involves obtaining and melting polylactic acid, obtaining a substrate surface that lacks absorbed gas, transferring liquid polylactic acid to the sample surface, forming a thin sheet-like surface of polylactic acid over the sample surface, placing a metal sheet over the polylactic acid surface, applying heat and pressure to the polylactic acid surface, and removing the metal sheet. Optionally, the polylactic acid coated surface can be irradiated with gamma radiation.

The polylactic acid powder can be melted to a temperature in the range of from about its glass point or above to about 300° C. In some methods an organic solvent can be added to the melted polylactic acid and the sheet-like surface of polylactic acid can be formed on the substrate surface by spraying.

The coated substrates prepared by the disclosed methods can be used as flooring and as furniture or in any application requiring hardened impact and abrasion resistant surfaces.

The coatings formed by the disclosed methods have the advantage of being derived from the renewable resource corn and are biodegradable.

FIGURES

FIG. 1 illustrates a stamping assembly that can be used to carry out the method of the disclosed methods.

Figure 2:
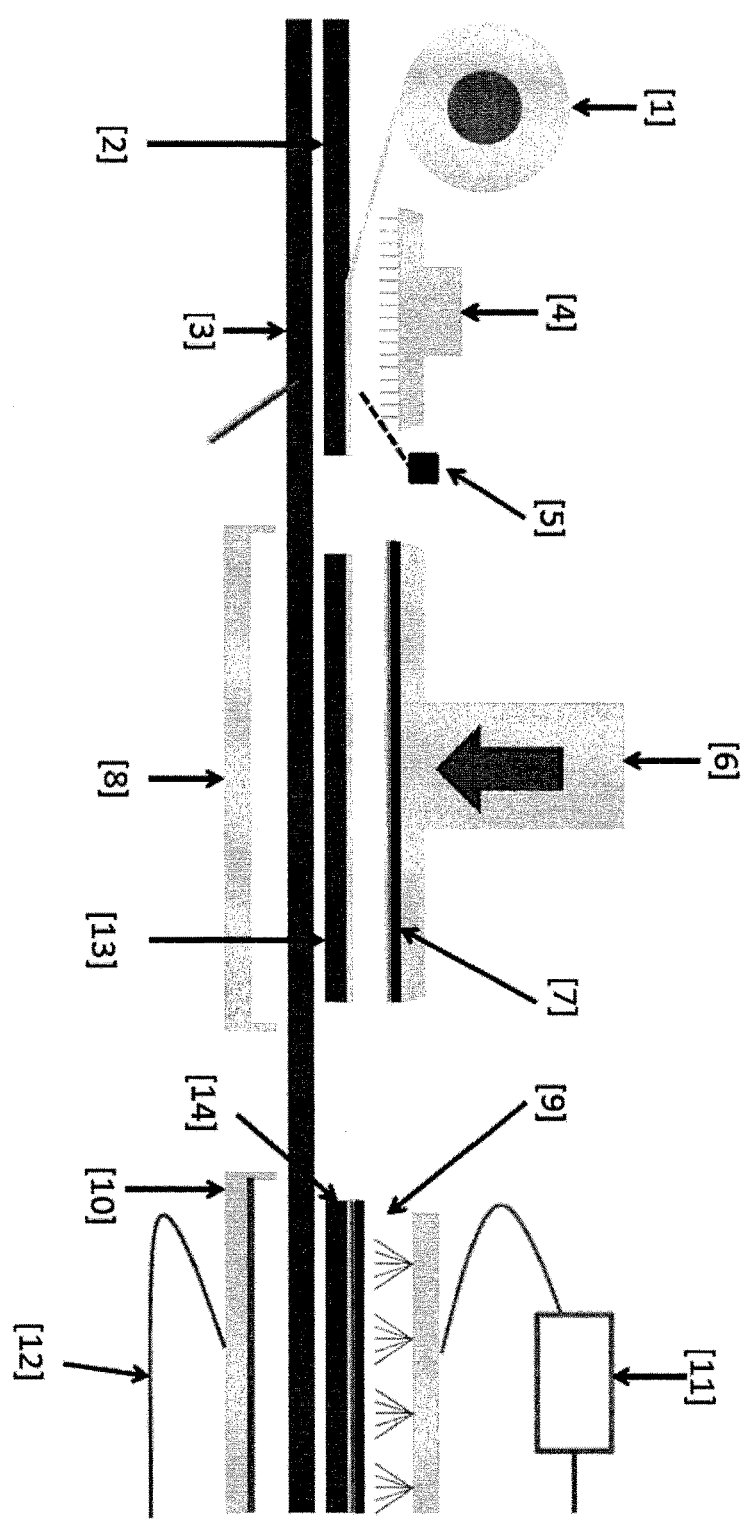

FIG. 2 illustrates a stamping assembly that can be used to carry out the method of the disclosed methods. Numbers in the FIG. 2 correspond to the following elements:
1 PLA SPOOL
2 Uncoated Wood
3 Conveyor
4 Radiant Heater
5 Temperature sensor
6 Mechanical Press
7 Flashing
8 PLA Overflow
9 Water Spray
10 Water Overflow
11 Water Pump
12 Pump Return Line
13 PLA Coated Wood
14 PLA Coated Wood with Flashing

DETAILED DESCRIPTION OF INVENTION

Novel coatings and methods for coating surfaces with PLA are disclosed. Polylactic acid (PLA) or PLA mixtures with triallyl isocyanurate (TAIC) have been prepared and used to coat wood samples followed by treatment of the coated surface with gamma radiation over various dosage ranges. Properties, such as hardness, discoloration and brittleness of the cured PLA-TAIC coating were found to be significantly affected by the amount of radiation used in the curing step. The coatings also can prevent chemical damage to wood. The coatings are particularly useful for flooring and furniture, such as tables, particularly table tops.

Generally the method for forming hard PLA coatings involves the following steps:
  Melt PLA powder into liquid
  Heat wood samples to degas
  Transfer liquid PLA to wood sample through dipping or scooping
  Form PLA into roughly sheet-like geometry
  Place metal sheet over plastic side of the sample
  Apply heat and pressure Prior to the development of the disclosed methods, PLA powder required substantial amounts of heating time in a preheated oven to obtain a melt. In contrast the disclosed methods have the advantage of reducing this treatment time to several tens of seconds to a few minutes. To accomplish this, PLA sheeting films can be formed and used. The films can be added to a pre-heated tray in an oven at about 300° C. Molten PLA before the point of discoloration can be obtained in this manner within seconds. Thereafter, samples such as wood surfaces can be pressed against the PLA and coated and then pressed against a hard cooling surface such as a metal or marble surface. The inverted wood sample can be pressed with standard force resulting in consistently uniform coatings of thickness of about 0.55 mm of PLA. Upon removal of force, the wooden samples can be removed from the surface during which aluminum flashing/foil backing also accompanies the sample. Removal of the aluminum requires quenching with water. Any suitable temperature can be used so long as it subsequently allows for removal of the backing. Room temperature is generally envisioned. The aluminum is readily peeled off and can be reused if desired. The quenching procedure can be used to facilitate the formation of smooth coating surfaces.

Hardness testing of samples prepared in this manner reveals a hardness of about 80 on a 0-100 scale (wherein, an eraser is hard to 10, rubber tires of autos range from 20 for soft to about 50 for trucks, and about 75 for a customary "hard safety hat" used at construction sites. It has been discovered that the addition of triallyl isocyanurate (TAIC) can be used to reduce the coating hardness to about 75 or lower. The hardness level can also be varied by controlling the amount of gamma radiation directed onto the surface. As shown in FIG. 1, hardness varies linearly with the dose gamma radiation.

Samples were subjected to two tests to determine their suitability for use as protective coatings. A drop test was performed from 10, 20, 30, and 40 cm with a screw having a mass of 0.15 kg. The other test involved force applied to a nail and dragged across the samples.

PLA-coated samples show no evidence of damage in either of the 10 or 20 cm screw drops across the board. Drops at 30 cm damaged some of the samples having thicker coatings, but did significantly less damage (little to negligible) with thinner coating layers. At a 40 cm drop height indents were minor but noticeable and there was some loss of adhesion in the surrounding area. There was an effect witnessed in medium thickness sheets on some of the wood samples where a loss of adhesion to the sample and corresponding shine accompanied shocks even from a 10 cm drop. However, this effect was only observed for the greatest force cases for the thicker and thinner sheets. Damage from the scratch test was negligible.

Comparison was made to polyurethane coated samples. Drop tests performed on these samples gave results that were similar to uncoated samples. Damage was noticeable at even the 10 cm drop heights and increased in depth with an increase in drop height. Scratch test performance was similar to or worse than the uncoated sample.

Comparison was also made to veneer samples. Damage on veneer samples began at 20 cm drop heights. Damage produced visible disturbance and minor depressions. The scratch test produced little if any visible damage.

In summary, the PLA coatings outperformed all the other samples tested in shock damage resistance. For the amount of force necessary to induce damage increased by at least a factor of 3 and up to a factor of 4 in the tests described above. For the scratch test there was a marked increase in tolerance compared to other coatings and while the increase was difficult to quantify, test result show the increase to be surprisingly significant.

One of the benefits seen in other applications of PLA is its biodegradability. Most efforts to date have focused on vastly increasing the speed of the process in order to comply with commercial composting regulations. Due to this effect there may be a limit to the lifetime of the disclosed coatings. Chemical additives can be added to reduce the degradation rate and slow the degradation process.

Temperature and the pressure are important parameters to control in the disclosed process. The glass point for PLA is approximately 60-80° C. Theoretically with enough force the plastic can be formed anywhere above this point. The plastic becomes an easily formable liquid at approximately 250° C. and has a viscosity close to that of water at about 270° C. Unfortunately, the plastic begins to discolor at about 265° C. Tiny gas bubbles will evolve from the interaction between hot plastic and wood that has not been degassed. This process can be mitigated by the application of pressure which has the added benefit of helping to shape the coating surface. In this method the pressure needs to be in excess of about 11 psi.

In order to produce PLA, lactic acid can be produced from corn starch using a bacterial fermentation. Known chemical processes can be used to turn the lactic acid into a lactide monomer and then to polymerize the monomers into the PLA polymer.

It takes 2.5 kg of corn to make 1 kg of PLA which equates to 0.57 pounds of corn per board foot. Thus, to produce 500,000 board feet of coating annually about 286,000 pounds of corn annually would be required.

A number of additional factors have been observed to affect the properties of the final product including the amount of radiation used to enhance cross-linking, retarding biodegradation, and maximizing hardness and adhesion. It has been observed that radiation hardening using gamma radiation from a cobalt-60 source significantly affects the physical properties of the resulting coating by increasing the amount of cross-linking and the hardness.

The PLA-based coating or sheeting may be colored by adding variable amounts of dyes to the molten PLA. Dyes added to PLA have been observed to readily permeate the material and upon solidification a colored coating results.

Another method for delivering grades of color shading involves careful control of the PLA temperature as it is put through the melting process. Between about 280° C. and about 300° C. a discoloration process begins with crystal clear PLA which begins to turn a deep dark brown at about 300° C. Beyond this temperature PLA begins to fume. Solidified PLA that has been exposed to these temperatures do not appear to vary in terms of resulting hardness nor abrasion resistance nor bonding capability with its wood substrates.

The addition of texture or gloss to the surface of PLA during and upon solidification can be included in the manufacture through the use of engraved imprints on the flashing used to hold the PLA, for example. Using flat aluminum flashing (0.01" thick) for baseline studies provided a smooth glossy structure to the surface of the solidified PLA coating on hardwood. However, when conventional aluminum foil was used to hold the melting PLA, the creases on the wrap caused during quenching were imprinted on the surface of the solidified PLA giving rise to an imprinted design that appeared as a semi-gloss finish. Designed flashing with predetermined patterns can be used to impart desirable design characteristics to the resulting surface of the PLA coating.

Certain methods provide for control over the thickness of PLA sheets. Instead of using hardwood and pressure thereof; a flashing of the type used to hold the molten PLA can be applied with a desired level of pressure to give rise to desired thicknesses of the PLA sandwiched in between. Thereafter, quenching on both sides gives rise to a propagating thermal wave leading to differential expansion-contraction at the interface between PLA and flashing and allowing for ready debonding and separation of the flashing and PLA sheet.

In certain methods various organic solvents can be readily dissolved in the PLA such that the resulting mixture can be applied using a spray technique. Organic solvents like acetone upon evaporation give rise to a layer of coated PLA. The hardness of resultant PLA is reduced in comparison to use of PLA by itself. Therefore, this method can be used to control the hardness of the resulting PLA coating.

Any thickness of flashing that can be quenched and removed from the coated substrate can be used in the disclosed methods. For example, aluminum sheeting having a thickness of about 0.01 inch can be used for the step of quenching-induced removal of the flashing used to hold and melt the PLA. It has been observed that 0.04 inch thick steel, when used as flashing, does not permit separation of the steel from solidifying PLA using the same quenching method. In this circumstance the steel substrate was observed to bond to the solidifying PLA. In certain methods this provides a way to create a sandwiched configuration where a metallic plate, for example, can be permanently bonded to the substrate.

It is believed that this observation has to do with rates of thermal waves propagating in various media, i.e., thermal diffusivity, $\alpha$ ($\alpha=k/\rho Cp$, where "k" is the thermal conductivity, $\rho$ is the density, and Cp is the thermal heat capacity). The greater the diffusivity, the faster is the thermal wave propagation. Units of diffusivity are given in $m^2/s$. For aluminum, stainless steel, water and PVC the values are $8.4\times10^{-5}$, $4.2\times10^{-6}$, $1.4\times10^{-7}$ and $8\times10^{-8}$, respectively. In general, for a given amount of thermal diffusivity, the greater the thickness or distance, the greater is the time required for the thermal wave to travel and then lead to expansion-contraction phenomena at interfaces. For two materials having the same thickness, a thermal wave will proceed 5 times faster in aluminum than in steel, and about a thousand times faster than in PVC. It has been observed that with aluminum flashing of 0.01 inch thickness, quenching in water for 2 minutes at 20° C. results in ready debonding and flashing removal. Thus, if it is desired to use stainless steel, a flashing of 0.01/5=0.002 inch thickness would be required to obtain the same result. Thus, an optimization process would be needed depending on the desired outcome.

The following examples are given by way of illustration only and should not be construed as limiting the subject matter of the present application.

EXAMPLE 1

The present example demonstrates the preparation of coated flooring using the disclosed methods. This procedure was followed using powder, rod, and film-type PLA (as indicated in the tables below) on 1 by 1 inch samples of Swiftlock™ Tuscany Stone engineered hardwood flooring. One gram of PLA was used for each sample. The only variances between sample types were the duration in the oven, duration of pressure application, and quenching times.

Samples were prepared as follows:
Heat oven [Vulcan 3-550] to 300° C.,
Place marble slab (3×6 inches) in oven,
Use 1.0 gram of designated PLA-type, and place measured PLA onto aluminum flashing (2×3×0.0093 inches),
Keep in oven at 300° C. for 2-5 minutes (used to get PLA to desired viscosity,
Quickly remove aluminum flashing with molten PLA from oven and place on a second marble slab. Add the wood sample (1×1 inch), face down, into the PLA and apply 220 psi of pressure for about 5-8 seconds,
Quench aluminum flashing by running room temperature tap water (measured to be 17.5° C., 0.5 L) on the side opposite of wood sample,
Peel back aluminum with minimal force required,
Remove excess PLA (overflow), a Dremel tool can be used,
Measure resulting coat thickness using calipers,
Test hardness using Shore D Durometer.

PLA Types and Sources

| PLA Type | Purchased | Brand | Model |
|---|---|---|---|
| Powder | ICO | NatureWorks, Ingeo | Ecorene NW 61-35 (35 Mesh) |
| Rod | Markerbot | NatureWorks, Ingeo | 40430 (3 mm coil) |
| Film | BI-AX | NatureWorks, Ingeo | F40EV (40 Micron Evlon PL Film) |

Summary of Hardness Data

| PLA Source | Coating Thickness (rom) | Hardness (ShoreD Scale) |
|---|---|---|
| Uncoated Hardwood | 0 | 65 |
| Powder | .65 | 80.5 |
| Rod | .55 | 81.2 |
| Film | .54 | 82.0 |

| Substrate | Hardness |
|---|---|
| Uncoated Hardwood | 65 |
| Polyurethane Hardwood | 64.5 |
| Coated Hardwood | 80.5 |
| Uncoated 2' × 4' | 40.5 |
| Coated 2' × 4' | 80 |
| Erase | 10 |
| Auto Tire | 20-50 |
| Golf Ball | 60 |
| Hard Hat | 75 |

The Shore D scale is based on ASTM D2240. The test involves the use of a hardened steel rod 1.1 mm-1.4 mm diameter, with a 30° conical point, 0.1 mm radius tip. This exerts 44.64 N of force. The final depth of penetration is indicative of the hardness of the material. An eraser would be around a 10, an auto tire would be 20-50, and a safety/construction hard hat would be a 75 on the Shore D scale.

Other coating techniques have been used, most notably the molten powder dip technique. In this technique, powder-type PLA was melted at around 280° C. in a metal tray (steel or aluminum). A wood sample was then dipped into the PLA when the PLA viscosity begins approaching that of water. It was then removed and placed on household aluminum foil [Diamond heavy duty and Jewel brands about 0.0019" thick] and pressure (about 220 psi) was added. Subsequently, the samples were quenched in tap water to remove the aluminum foil.

Wood Types and Sources

All samples are engineered hardwoods purchased from either Lowe's or Home Depot.

| Manufacturer | Type | Model | Serial SKU |
|---|---|---|---|
| Natural Floors | Brazilian Cherry | 1OL30SL1 | 143978 |
| Bruce Hardwood Floor | Mineral Wood | L4009 | 502-529 |
| Bruce Hardwood Floor | Maple Chocolate | L3046 | 505-309 |
| Pergo-Presto | Spiced Walnut | LF000151 | 376-177 |
| Pergo-Presto | Antique Maple | LF000152 | 376-992 |
| Pergo-Prestige Exotics | Natural Jojoba | LF000171 | 362-256 |
| Pergo-Prestige Exotics | Loft Walnut | LF000159 | 404-292 |

| Manufacturer | Type | Model | Serial SKU |
|---|---|---|---|
| Pergo-Prestige Exotics | Pacific Bamboo | 04798 | 820-263 |
| Pergo-Prestige | Rustic Chestnut | LF000145 | 364-686 |
| SwiftLock | Tuscany Stone | D2788RE | 312960 |

Triallyl Isocyanurate (TAIC) was added to determine if gamma irradiation via Cobalt-60 would improve the hardness of flooring samples. Samples were prepared with 2, 3.5, 4, 6, and 8% TRIC by mass. The data shown here is for 3.5% TRIC by mass. A Co-60 Irradiator was used for 24, 48, and 65 hours to test the relationship between hardness and radiation dose. The irradiator gives a dose of 600 Rad/min into known material. Dose rates for samples were expected to be similar. The resulting data is shown in FIG. 1 and depicts a linear relationship between hardness and acquired gamma radiation dose. This demonstrates that TRIC along with other possible additives can be a viable option for material modification if such a product enhancement is desired.

Equipment that has been useful to carrying out the methods of the invention are listed below.

| Item | Manufacturer | Model | Other |
|---|---|---|---|
| Oven | Ney | Vulcan 3-550 | |
| Aluminum Flashing | Amerimax | 68310 | 10" × 10' roll 0.0092 inch thickness |
| Marble Slab | Premium Natural Stones | Grecian White | 3 × 6 in. |
| Shore D Durometer | | 8040223 | |
| Calipers | Fowler | 6525546 B1 | |
| Dremel Multipro | Dremel | 395 | |
| Scal (small) | A E Adam | AFP-210L | |
| Scale (large) | Continental SCale | Health-O-Meter | |

The invention claimed is:

1. A flooring of furniture substrate comprising a polylactic acid coating that is not irradiated with gamma irradiation and having polylactic acid molecules that are less than—fully—cross-linked, the polylactic acid residing on a portion of the surface of the substrate the coating having a hardness as measured on the Shore D Scale of at least 75 to about 85.

2. The flooring or furniture substrate of claim 1 wherein the polylactic acid coating resists abrasions, impacts and scratches.

3. The substrate of claim 1 wherein the substrate is flooring.

4. The substrate of claim 1 wherein the substrate is furniture.

5. The flooring or furniture substrate of claim 1 wherein the polylactic acid coating further comprises triallyl isocyanurate.

6. The flooring or furniture substrate of claim 1 further comprising from about 1 to about 10 mass percent of triallyl isocyanurate with respect to polylactic acid.

* * * * *